United States Patent

Harper

[11] B 3,925,047
[45] Dec. 9, 1975

[54] REMOVAL OF MOISTURE FROM A NATURAL GAS STREAM BY CONTACTING WITH A LIQUID DESICCANT-ANTIFREEZE AGENT AND SUBSEQUENTLY CHILLING

[75] Inventor: Ernest A. Harper, Bartlesville, Okla.

[73] Assignee: Phillips Petroleum Company, Bartlesville, Okla.

[22] Filed: Dec. 3, 1973

[21] Appl. No.: 421,383

[44] Published under the Trial Voluntary Protest Program on January 28, 1975 as document no. B 421,383.

Related U.S. Application Data

[63] Continuation of Ser. No. 101,240, Dec. 24, 1970, abandoned.

[52] U.S. Cl. .............................. 62/20; 62/28; 62/40; 55/31; 55/32; 208/188
[51] Int. Cl.² ......................... F25J 3/00; F25J 3/02
[58] Field of Search .......... 62/28, 40, 20; 55/31, 32

[56] References Cited
UNITED STATES PATENTS
3,330,124 7/1967 Marshall .............................. 55/32
3,531,915 10/1970 Nagel ................................. 55/32

FOREIGN PATENTS OR APPLICATIONS
1,133,497 7/1962 Germany ............................ 55/32

*Primary Examiner*—A. Louis Monacell
*Assistant Examiner*—Frank Sever

[57] ABSTRACT

A moisture-containing gas is contacted with a liquid desiccant-antifreeze agent in such a manner as to remove at least a portion of the moisture in the gas and introduce a sufficient amount of said agent in vapor phase into said gas to prevent the formation of solids in subsequent processing steps.

7 Claims, 1 Drawing Figure

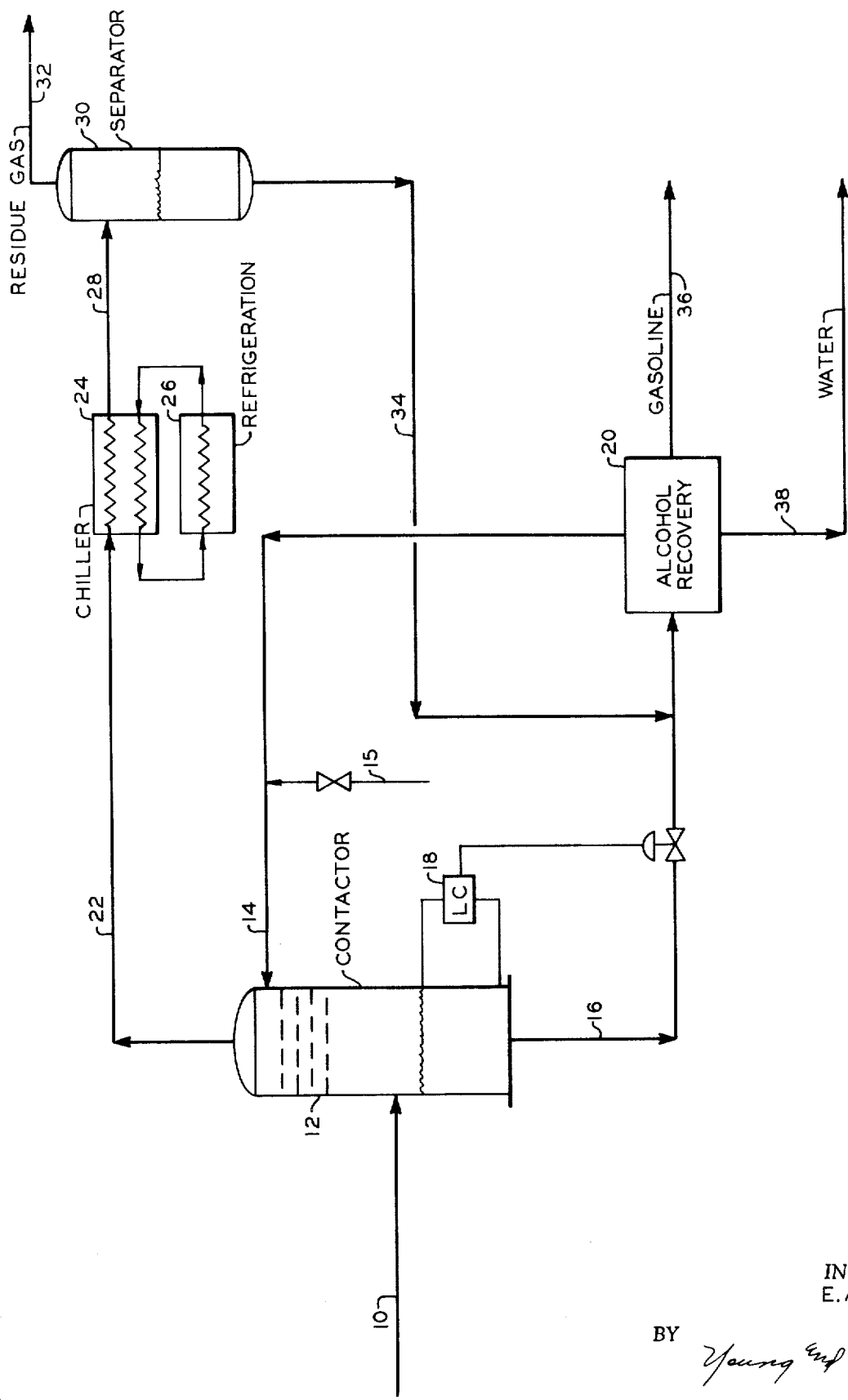

REMOVAL OF MOISTURE FROM A NATURAL GAS STREAM BY CONTACTING WITH A LIQUID DESICCANT-ANTIFREEZE AGENT AND SUBSEQUENTLY CHILLING

This is a continuation application of my copending application having Ser. No. 101,240, filed on Dec. 24, 1970, now abandoned.

This invention relates to reducing the moisture content of gases.

It is well known to refrigerate gas streams to facilitate the separation of impurities therefrom, or to facilitate the separation of the various components in gas mixtures. For example, it is common practice to refrigerate a natural gas feedstock to a temperature low enough to condense some of the heavier hydrocarbons such as propane and heavier which are contained therein. The liquefied hydrocarbons are then easily separated from the gaseous residue consisting essentially of methane and some ethane. If desired, the gas can be cooled to a temperature sufficient to condense some or all of the ethane. It is sometimes desirable to totally liquefy the natural gas for transportation as liquefied natural gas (LNG). One problem in reducing the temperature of natural gas streams much below 32° F. is the condensation of the water vapor usually contained therein. Said water vapor crystallizes as ice crystals and/or water-hydrocarbon-hydrate crystals. Said water-hydrocarbon-hydrate crystals are usually formed at temperatures above 32° F., sometimes as high as 40° F. In such instances, the solid crystals plug the heat exchangers in the system and make operation impossible after a very short time. Carbon dioxide and hydrogen sulfide, if present, will also freeze out of the gas if the gas is cooled to sufficiently low temperatures, e.g., in the order of −115° F.

The formation of such solid deposits in natural gas low temperature processing plants has been alleviated in the past by removing as much of the water and carbon dioxide as possible before the gas is cooled below the temperature at which said solids begin to form. One method which has been employed to remove the water comprises contacting the gas with high boiling (low vapor pressure) liquid desiccants such as diethylene glycol and triethylene glycol to absorb the water. High boiling desiccants are used in such processes so as to minimize introduction of the desiccant into the gas stream by evaporation. Such processes have the disadvantage of high operating costs, particularly in the recovery of the desiccant. In addition, glycols become very viscous at low temperatures and present a handling problem. Another method which has been employed has been to pass the gas through towers containing solid adsorbents such as silica gel, molecular sieves, solid caustic, etc. However, because of the operating expense of such processes, particularly with respect to adsorbent costs, cheaper solutions to the problem have been sought. In recent years an antifreeze such as methyl alcohol has been injected into the natural gas feedstock and passed together with said feedstock through the low temperature heat exchangers. As the water is condensed from the gas, it is adsorbed by the alcohol to form a liquid alcohol-water phase which separates from the gaseous feedstock being cooled. Generally speaking, this process has been more economical than the use of drying adsorbers, either liquid desiccant or solid desiccant adsorbers, but has not been without its problems. For example, when the heavier hydrocarbons condense from the natural gas feedstock in contact with the alcohol-water phase, two liquid phases are present in the equipment, a hydrocarbon phase and a water-alcohol phase. Since the alcohol is also soluble in the hydrocarbon phase, the alcohol may transfer from the alcohol-water phase to said hydrocarbon phase which is present in larger amounts, leaving insufficient alcohol in the water, which will then freeze and plug the equipment.

The present invention provides a solution to the above-described problems. The present invention provides a combination treating process wherein the gas to be treated is contacted with a liquid desiccant-antifreeze agent in such a manner as to (1) remove at least a portion of the moisture contained in the gas, and (2) introduce a sufficient amount of said agent in vapor phase into said gas to prevent formation of solids in subsequent low temperature processing steps.

Thus, according to the invention, there is provided a process for reducing the moisture content of a moisture-containing gas stream and injecting an antifreeze agent into said gas stream so as to prevent solids formation in said gas stream in a subsequent low temperature processing step, which process comprises: contacting said gas stream with an aqueous liquid desiccant-antifreeze agent in an amount and under temperature and pressure conditions which are sufficient to (a) absorb at least an amount of said moisture into said agent and (b) vaporize an amount of said agent into said gas stream, which are sufficient to prevent said solids formation.

Any suitable liquid desiccant-antifreeze agent can be used in the practice of the invention. Suitable agents include those which are miscible with water, are inert or essentially inert with respect to the gas being treated, have a low viscosity at low temperatures, and which have a volatility (high vapor pressure) sufficient to permit sufficient vaporization thereof into the gas under the treating conditions being employed. Examples of suitable agents for use in the practice of the invention include, among others, the following: methyl alcohol, ethyl alcohol, propyl alcohol, isopropyl alcohol, acetone, methyl ethyl ketone, etc. Methyl alcohol is a presently preferred agent because of the combination of desirable properties and cost. Low viscosity is a desirable property for easy flow of the liquid agent in the low temperature portions of the plant.

Said liquid desiccant-antifreeze agents can be used in any desirable or necessary amount which is sufficient to remove at least a portion of the moisture contained in the gas being treated and introduce sufficient of said agent into said gas for protection in the subsequent low temperature processing step(s), in accordance with the invention. The actual amount of agent used in any particular situation will depend, of course, on the water content of the gas being treated, the amount of water to be removed, and the amount of agent to be left in gaseous effluent from the treater. The contacting of the gas with said agent can be carried out in any convenient or suitable manner, for example, by bubbling the gas through the treating agent or by passing the gas through a contacting tower or vessel countercurrent to a descending stream of the agent. Said contacting tower or vessel can by any suitable type of tower or vessel. For example, a tower provided with any suitable type of contacting device(s) or medium, e.g., bubble-cap trays, sieve trays, or packed with a packing material such as rings or saddles. Thus, the tower may be operated much like a fractionator, i.e., with vapor substantially filling the tower and flowing upward countercurrently to the descending agent which occupies a liquid layer on each of the trays. Or, the tower may be substantially filled with the liquid agent with the gas phase bubbling upward therethrough.

Operating conditions in the contacting step of the invention will depend upon the gas being treated, the treating agent being used, the amount of water contained in the gas, the amount of said contained water which it is desired to remove, the amount of said agent to be introduced into the treated gas for antifreeze purposes in subsequent low temperature processing steps, and other interrelated factors. Generally speaking, two of the most important operating variables are temperature and pressure. Generally speaking, the contacting of the gas with the treating agent can be carried out at temperatures within the range of from 0° to 200° F., preferably 40° to 125° F. The pressure employed will depend somewhat upon the temperature and will usually range from 5 to 5,000, preferably 100 to 1,000, psig. Generally speaking, in most instances, said temperatures and pressures will be governed by the temperature and pressure of the incoming gas stream.

The conditions of temperature and pressure employed in the contacting step are also related to the composition, e.g., water content, of the treating agent. An essentially pure treating agent can be used to remove water from gases. However, I have now found that this is neither necessary nor desirable, particularly when the gas is to be passed through a subsequent low temperature processing step. I have now discovered it is more economical to use an aqueous treating agent, e.g., aqueous methyl alcohol, containing a major proportion of treating agent and a minor proportion of water, than to use pure treating agent. When using such a treating agent, the major proportion of the water contained in the gas can be removed therefrom and simultaneously there will be uniformly introduced into the gas a sufficient amount of said treating agent to prevent solids formation in subsequent low temperature processing operations. The use of pure treating agent would result in removing essentially all the water present in the gas but would also introduce an excessive amount of the treating agent into said gas unless the treating operation is carried out at low temperatures, e.g., about −100° F., or lower. However, refrigeration for such processes is expensive. Thus, economics dictate that the use of refrigeration in contactor 12 be avoided, if possible. Economics also dictate that only sufficient antifreeze agent be introduced into the gas stream to prevent hydrate formation because the agent so introduced must eventually be removed from the gas and recovered for reuse.

For example, if a natural gas stream saturated with water vapor at 80° F. and 550 psig (55 pounds of water per million cubic feet of gas measured at standard conditions of temperature and pressure) is contacted with methyl alcohol containing about 98 percent alcohol and 2 weight percent water, the treated gas will contain only about 1 pound of water and about 350 pounds of methyl alcohol per million cubic feet of gas, assuming the contactor is operated at 80° F. and 550 psig. This is clearly more alcohol than is required to prevent 1 pound of water from freezing. Thus, it is preferable to operate with an alcohol stream containing, for example, about 25 weight percent water and 75 weight percent methyl alcohol. When using such a treating agent, the treated gas will have a water content of about 10 pounds and an alcohol content of about 100 pounds per million cubic feet of gas. The following table illustrates how the alcohol and water contents of the treated gas from a methyl alcohol scrubber varies as the alcohol content of the methanol-water scrubbing agent is varied (In each case natural gas at 550 psig and 80° F. saturated with water is passed into the scrubber as feed gas.):

| Methanol Content of Alcohol-Water Contacting Solution, wt. % | Treated Gas Composition, lb./million cu. ft. | |
|---|---|---|
| | Methanol | Water |
| 100 | 420 | 0 |
| 98 | 350 | 1 |
| 90 | 250 | 5 |
| 80 | 150 | 8 |
| 75 | 100 | 10 |
| 50 | 60 | 40 |

Generally speaking, the contacting solutions used will preferably contain from about 51 to about 90, more preferably about 60 to about 85, weight percent of treating agent, e.g., methyl alcohol, and from about 49 to about 10, more preferably about 40 to about 15, weight percent water. Said contacting solutions will preferably be used in quantities sufficient to supply from about 50 to 5,000, more preferably about 100 to about 1,000, pounds of agent per million cubic feet of gas being treated.

The drawing is a diagrammatic illustration of at least one embodiment of the invention. Referring now to the drawing, the invention will be more fully explained. A natural gas feedstock consisting essentially of methane and containing relatively small amounts of ethane, propane, butanes, and heavier hydrocarbons, and also saturated with water at 550 psig and 80° F. (55 pounds of water per million cubic feet of gas measured at standard conditions of temperature and pressure), is introduced via conduit 10 into the lower portion of gas-liquid contactor 12. Said gas passes upward through the contacting trays shown, countercurrently to a descending stream of treating agent, e.g., methyl alcohol, introduced via conduit 14. Make-up treating agent can be introduced via conduit 15, as needed. About 2 to 6 trays of conventional design, e.g., bubble-cap or sieve, are usually sufficient for the alcohol to absorb at least the major portion of the water from the gas, thus producing a treated gas containing a reduced amount of water. The resulting water-alcohol solution is removed from the lower portion of contactor 12 via conduit 16 responsive to liquid level controller 18 and passed to alcohol recovery unit 20, described hereinafter. It will be understood that liquid level controller 18 can also be positioned to maintain the level of contacting solution above the inlet of conduit 10, e.g., as when the tower 12 is operated substantially filled with contacting solution.

The treated gas stream having a reduced water content is removed from contactor 12 via conduit 22 and introduced into chiller zone 24 wherein it is cooled. Said chiller zone 24 can comprise any suitable arrangement of one or more heat exchange units known to the art suitable for cooling the gas and condensing the heavier hydrocarbons such as propane and heavier therefrom. The heat exchanger(s) is cooled by heat exchange with cold fluid produced by a conventional refrigeration unit 26. If desired, said gas can be cooled sufficiently to completely liquefy the gas being treated. In this event, it is necessary to remove the alcohol-water mixture from the gas stream before it is cooled to −180° F. as this is the eutectic freezing point for the methanol-water mixture. The gas stream would thus be cooled to about −160° F. in chiller zone 24 and would then pass into a gas-liquid separator from which the alcohol-water layer would be withdrawn. The remaining gas would then be additionally cooled and completely liquefied at a temperature in the range of −250° F.

Assuming that only the heavier hydrocarbons are liquefied, the effluent from chiller zone 24 is passed via conduit 28 into phase separation zone 30. Nonliquefied residue gas consisting essentially of methane together with some ethane is withdrawn from separation zone 30 via conduit 32 as a product of the process. Liquids are withdrawn from separation zone 30 via conduit 34, preferably are combined with the water-alcohol stream in conduit 16, and introduced into alcohol recovery zone 20.

Said alcohol recovery unit or zone 20 can comprise any suitable arrangement of equipment for separating the water, gasoline (condensed heavier hydrocarbons), and the alcohol. Said gasoline is removed from the alcohol recovery zone 20 via conduit 36 as another product of the process. Reject water removed from the gas stream is withdrawn from alcohol recovery zone 20 via conduit 38. The recovered alcohol is removed from recovery zone 20 via conduit 14 and recycled to contactor 12 for use therein as described above.

As disclosed and claimed in copending application Ser. No. 101,372, filed of even date herewith, by W. A. McClintock and M. O. Clark, said alcohol recovery unit or zone 20 can comprise a liquid-liquid contactor wherein the liquid stream from conduit 34 is first water washed countercurrently with a stream of water to extract the alcohol from the condensed hydrocarbons. The resulting water-alcohol solution can then be combined with the water-alcohol solution in conduit 16 and introduced into a water-alcohol fractionator. An overhead stream containing alcohol and an adjusted or controlled amount of water can be withdrawn overhead from said fractionator and introduced via conduit 14 into contacting zone 12. Water separated from the alcohol is withdrawn from the bottom of the fractionator and at least a portion thereof can be used as the water in the said liquid-liquid contactor for washing the alcohol from the condensed hydrocarbons in conduit 34. Any other suitable scrubbing agent, e.g., the various glycols, can be used for recovering the methyl alcohol from the stream in conduit 34.

The combination process of the invention makes it possible to subject a gas to low temperature processing operations, such as are carried out in chiller 24, without danger of ice or hydrate formation in said chiller, because most of the water is removed from the gas stream in contactor 12 while simultaneously injecting a sufficient amount of vaporous antifreeze agent into the treated gas stream prior to its introduction into said chiller zone. Thus, a number of advantages are realized or obtained in the practice of the combination process of the invention. One advantage is the elimination of the use of expensive treating processes employing expensive solid adsorbent desiccants. Another advantage is the elimination of the use of high boiling (low vapor pressure) liquid desiccants with their attendant expensive recovery steps. Still another advantage is the elimination of the necessity for using expensive low temperature treating when using high vapor pressure liquid desiccants. Another advantage is the elimination of the difficulties and unreliable results obtained when liquid antifreeze agents such as methyl alcohol are introduced into the gas in liquid form. It is preferred that the antifreeze agent introduced into the treated gas stream be present in said gas stream in vapor form in order to insure equal distribution thereof in the gas. This will insure uniform distribution of the antifreeze agent in the gas while it is passing through the numerous passageways of the heat exchangers in chiller zone 24. If the antifreeze agent were present in the treated gas as a liquid, it would tend to concentrate in the lowermost portions of the heat exchange passageways and thus give little or no protection against the formation of hydrates or ice crystals in the upper passageways of the heat exchangers.

While the invention has been described with particular reference to treating a stream of natural gas, other gases can also be treated in accordance with the invention. Individual hydrocarbon gases such as methane, ethane, propane, etc., can also be treated. Other gases which can be treated in accordance with the invention include carbon monoxide, hydrogen, nitrogen, etc.

The following calculated example will serve to further illustrate the invention.

EXAMPLE

A stream of natural gas consisting essentially of methane is contacted with an aqueous methyl alcohol solution essentially as described above in connection with the drawing. Flow rates, stream compositions, and operating conditions are tabulated below where the numbers in parentheses refer to elements in said drawing.

| | |
|---|---|
| Wet Gas (10) | |
| Flow Rate, million standard cu. ft. per day (MMSCF/D) | 100 |
| Temperature, °F. | 80 |
| Pressure, psig | 550 |
| Composition, mol % | |
| Methane | 90 |
| Ethane plus | 10 |
| Water, lb. per million standard cu. ft. of gas | 55 |
| Contactor (12) | |
| Diameter, ft. | 10 |
| Height, ft. | 20 |
| Sieve trays, number | 2 |
| Pressure, psig | 550 |
| Temperature, °F. | 80 |
| Scrubing Solution (14) | |
| Wt. % Methanol | 75 |
| Wt. % Water | 25 |
| Rate, lb./day | 30,000 |

-continued

| | |
|---|---|
| Freezing Point, °F. about | −150 |
| Make-up Methanol (15), lb./day | 1,000 |
| Treated Gas (22) | |
| Rate, MMSCF/D | 100 |
| Water Content, lb./MMSCF | 10 |
| Alcohol Content, lb./MMSCF | 100 |
| Spent Scrubbing Solution (16) | |
| Wt. % Methanol | 51 |
| Wt. % Water | 49 |
| Rate, lb./day | 24,500 |
| Freezing Point, °F. about | −50 |
| Separator (30) | |
| Pressure, psig | 500 |
| Temperature, °F. | −100 |
| Water in Residue Gas (32), parts per million (PPM) | 0.3 |
| Methanol in Residue Gas (32), PPM | 4 |
| Gasoline in Condensate (34), lb./day | 400,000 |
| Water, lb./day | 900 |
| Methanol, lb./day | 9,000 |
| Alcohol Recovery (20) | |
| Gasoline Recovery, lb./day | 400,000 |
| Water Reject, lb./day | 5,400 |

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for reducing the moisture content of a moisture-containing gas stream without substantial moisture removal prior to injecting an antifreeze agent into said gas stream so as to prevent solids formation in said gas stream in a subsequent low temperature processing step, which process comprises: contacting said gas stream which is at an atmospheric temperature in the range 40°–125°F with an aqueous liquid solution containing 51 to 90 weight percent of a low boiling (high vapor pressure) desiccant-antifreeze agent and 49 to 10 weight percent water in an amount and at a temperature in the range 40°–125°F and pressure conditions which are sufficient to (a) absorb a major amount of said moisture from said gas stream into said agent to form a water-agent solution and (b) simultaneously vaporize an amount of said agent into said gas stream removed from said contacting sufficient to prevent said solids formation from residual moisture remaining in said gas stream in a subsequent low temperature processing operation, and chilling said gas stream to a temperature sufficient to condense substantially all of the propane and heavier hydrocarbons therefrom and form a condensate comprising said condensed propane and heavier hydrocarbons, water, and said agent, but at a temperature sufficiently above the eutectic freezing point for the water-agent solution to prevent freezing of the water-agent solution and formation of solids during said chilling.

2. A process according to claim 1 wherein said agent is selected from the group consisting of methyl alcohol, ethyl alcohol, propyl alcohol, isopropyl alcohol, acetone, methyl ethyl ketone, and mixtures thereof.

3. A process according to claim 1 wherein said agent comprises methyl alcohol, said water-agent solution is separated from said contacting and regenerated to remove agent therefrom, which agent is recycled to said contacting, and said gas stream removed from said contacting is chilled and passed to a separation zone from which a water-agent layer is withdrawn and regenerated along with said water-agent solution separated from said contacting.

4. A process according to claim 1 wherein said gas stream comprises natural gas and said agent comprises methyl alcohol and the amount of methyl alcohol vaporized into said gas stream is from about 50 to 5,000 pounds of agent per million cubic feet of gas being treated.

5. A process according to claim 4 wherein said agent comprises an aqueous methyl alcohol solution containing 60 to 85 weight percent of methyl alcohol and 40 to 15 weight percent of water and said natural gas consists essentially of methane and contains relatively small amounts of ethane, propane, butanes, and heavier hydrocarbons and is saturated with water.

6. A process according to claim 1 comprising the steps of:
   a. contacting a natural gas stream countercurrently in a contacting zone with said agent;
   b. withdrawing a moisture-enriched stream of said agent from the lower portion of said contacting zone and passing same to an agent recovery zone;
   c. withdrawing from the upper portion of said contacting zone a moisture-lean stream of said gas now containing a small amount of said agent and passing same to a chiller zone, said amount of said agent being sufficient to prevent said solids formation in said chiller zone;
   d. passing said gas stream from step (c) to a phase separation zone;
   e. withdrawing a treated gas stream from said separation zone of step (d) as a product of the process;
   f. passing a liquid phase comprising condensed hydrocarbon and said agent from said separation zone of step (d) to said agent recovery zone;
   g. withdrawing a stream of condensed hydrocarbon from said agent recovery zone as another product of the process;
   h. withdrawing a stream of water from said agent recovery zone;
   i. withdrawing a stream comprising recovered liquid desiccant-antifreeze agent from said recovery zone; and
   j. returning said recovered agent of step (i) to said contacting zone in step (a) as the agent used therein.

7. A process according to claim 6 wherein said agent comprises methyl alcohol.

* * * * *